United States Patent [19]

Zadok

[11] Patent Number: 5,648,756
[45] Date of Patent: Jul. 15, 1997

[54] THIRD BRAKE LIGHT AND ILLUMINATED MESSAGE COMBINATION

[76] Inventor: Shlomo Zadok, 739 N. Occidental Blvd. #6, Los Angeles, Calif. 90026

[21] Appl. No.: 358,194

[22] Filed: Dec. 16, 1994

[51] Int. Cl.$^6$ ................................................. B60Q 1/26
[52] U.S. Cl. ........................ 340/468; 340/464; 340/479
[58] Field of Search .................................. 340/468, 473, 340/472, 464, 479, 486

[56]  References Cited

U.S. PATENT DOCUMENTS

| | | | |
|---|---|---|---|
| 1,633,868 | 6/1927 | Myers | 340/486 |
| 1,677,883 | 7/1928 | Carlsen | 340/486 |
| 1,752,122 | 3/1930 | Thieler | 340/486 |
| 2,138,796 | 6/1938 | Mason | 340/486 |
| 2,223,678 | 12/1940 | Elliot | 340/486 |
| 4,631,516 | 12/1986 | Clinker | 340/464 |
| 4,736,280 | 4/1988 | Simidian | 362/80 |
| 4,763,234 | 8/1988 | Scott | 362/293 |
| 4,843,369 | 6/1989 | Jimenez et al. | 340/479 |
| 4,868,542 | 9/1989 | Thompson | 340/468 |
| 4,868,719 | 9/1989 | Kouchi et al. | 362/61 |
| 4,871,995 | 10/1989 | Hoang | 340/487 |
| 4,928,084 | 5/1990 | Keiser | 340/479 |

*Primary Examiner*—Jeffery Hofsass
*Assistant Examiner*—Julie B. Lieu
*Attorney, Agent, or Firm*—Walter Unterberg

[57] ABSTRACT

The Third Brake Light and Illuminated Message Combination of this invention is powered by the vehicle battery and features a rotatable light box with a number of plane facets consisting of translucent, red-tinted, windows, each of which holds a different transparent strip with a message or graphic. The light box is placed on the rear window shelf of the vehicle. When the vehicle brakes are applied, electric lamps attached to a reflector inside the light box illuminate solely the facet and attached message which face to the rear where they can be seen by the driver of the following car. The number of facets can vary from two to eight. A control unit on the dashboard is wired to an actuator on the light box to permit the driver to rotate the light box to display different messages. The circuitry also illuminates a light panel on the control unit to indicate continuously which message is on display. The indicator light may be turned off by the driver, but will still light up every time the brakes are applied. The preferred embodiment uses a solenoid-and- ratchet type actuator to rotate the light box, combined with a rotary switch for the indicator circuit. This invention has the advantages of simplicity, high reliability, low manufacturing cost, ease of installation and straightforward operation.

9 Claims, 3 Drawing Sheets

THIRD BRAKE LIGHT AND ILLUMINATED MESSAGE COMBINATION

BACKGROUND OF THE INVENTION

1. Field of the Invention

This invention relates to motor vehicle rear third brake light devices visible to drivers of following vehicles. More specifically, it relates to a combination of a third brake light with a changeable message controlled by the vehicle driver.

2. Description of Related Art

In recent years eye-level rear third brake lights on motor vehicles have found extensive use, and in fact have been required by law on all new cars operated in the United States since 1986. The primary purpose of the third brake light is to attract the attention of the driver of the following vehicle more strongly than achievable by the two conventional rear brake lights alone located lower on the vehicle. That driver's reaction time is reduced and as a result fewer rear end collisions have occurred and traffic safety has improved. The millions of cars built before 1986 still in operation ( and legally not required to contain a third brake light) could benefit from retrofitting a third brake light for greater safety.

The backs of vehicles have also been used to display messages and slogans for the attention of the driver of the following vehicle. The messages have usually been placed on bumper stickers, rear window stickers, or on displays placed inside the vehicle on the rear window shelf. In recent years such sticker messages have largely fallen into disuse except at election time.

An incentive to retrofit a third brake light is provided by combining it with one of a selection of stored messages. Such a combination will interest prospective retrofit buyers if it has the attractive features of being versatile, effective, simple, inexpensive, easy to install, and straightforward to operate with easy changing of the contents of the stored messages.

A search in the U.S. patent literature revealed a number of third brake light combinations, but none of them having all the ettractive features mentioned above. Simidian (U.S. Pat. No. 4,736,280) discloses a combination with directional signals and a paper products dispenser, but no message. Scott (U.S. Pat. No. 4,763,234) shows a single message which is normally visible through reflection of ambient light, but obscured by a strong third brake light when the brakes are applied. Jimenez et al. (U.S. Pat. No. 4,843,369) has changeable indicia to indicate various information when the braking system is activated. This is achieved by a rotating endless belt on which several transparent indicia panels are mounted, with a cumbersome electric motor-and-clutch arrangement. With the limited space available on the rear shelf of a vehicle and the necessity for clear spaces between adjacent panels on the belt in the particular design, the number of indicia panels is limited, even with brief messages.

Thompson (U.S. Pat. No. 4,868,542) provides a selection of messages by means of a dash-mounted programmable computer. This is an expensive arrangement for the average buyer. Kouchi et al. (U.S. Pat. No. 4,868,719) provides for multiple messages by means of two circuit boards with a multiplicity of LED's in a variable matrix display. This is again a costly system. Hoang (U.S. Pat. No. 4,871,995) discloses a single sign which is electro-mechanically raised to a visible position by brake application. Here there is no multiple selective message capability. Reiser (U.S. Pat. No. 4,928,084) displays selected messages by means of a programmable memory through LED's mounted on a rearfacing screen. This again is an expensive system.

Consequently, the present invention Third Brake Light and Illuminated Message Combination was conceived to provide the attractive features mentioned above expressed in terms of the objects as stated below.

OBJECTS OF THE INVENTION

It is an object of this invention to provide a third brake light and illuminated message combination which is versatile, being capable of displaying a message selected by the driver from a number of messages which have been previously prepared and stored.

It is an additional object to provide a third brake light and illuminated message combination which is effective in drawing the attention of the driver of the following vehicle to the illuminated message which appears when brakes are applied in the vehicle carrying the combination.

It is a further object to provide a third brake light and illuminated message combination which contributes to enhanced traffic safety for vehicles built before 1986.

It is another object to provide a third brake light and message combination which is simple in construction, with few components, and therefore has high reliability.

It is another object to provide a third brake light and illuminated message combination which has low manufacturing costs and therefore is inexpensive to purchase.

It is a further object to provide a third brake light and illuminated message combination which is easy to install as a retrofit by lay persons.

It is another object to provide a third brake light and illuminated message combination which is straightforward to operate by the driver, who selects the message to be illuminated from an indicator display on the dashboard, and can also darken the indicator display at will.

It is an additional object to provide a third brake light and illuminated message combination in which it is easy to change the contents of the stored messages.

SUMMARY OF THE INVENTION

To implement the stated objects of the invention, a Third Brake Light and Illuminated Message Combination has been devised. The central component of this is a rotatable light box with a number of plane facets consisting of translucent red-tinted windows, each of which holds a transparency with a printed or stencilled message or graphic. The box is placed on the rear window shelf of the vehicle. A rotation mechanism controlled by the driver of the vehicle rotates the box to bring any selected facet into the display position facing the rear window. Electric lamps attached to a reflector inside the light box illuminate only the facet in the display position, the other facets remaining dark.

The driver actuates the rotation mechanism to bring a desired facet into the display position and keeps track of the light box angular position by use of a control unit mounted in front of him or her on the vehicle dashboard. The control unit is connected to the light box by suitable circuitry and mechanisms to accomplish the actuation and indication functions.

The control unit face contains a number of translucent light panels corresponding to the number of facets, a push switch and a selector switch. Each light panel is surrounded by a frame into which are inserted replaceable small replicas of the corresponding light box transparencies. Each push of the push switch rotates the light box from one facet to the next; the actual facet on display is indicated by illumination of the corresponding panel on the control unit. The selector switch on the control unit gives the driver the option of darkening the indicating light panel on the control unit after the desired facet is on display, rather than have the indicating light panel stay illuminated.

All circuitry uses the vehicle battery, usually 12 volt, as a power source. To accomplish the brake light function, the light box lamps are wired through the vehicle brake switch, so that the message on display on the light box is only illuminated—in red—when the driver steps on the brake. If at that moment the selector switch is in the dark position, the circuitry illuminates the indicating light panel on the control unit as long as the brake switch makes contact as a reminder to the driver.

A manual override of the light box rotation mechanism enables the facets to be rotated by hand on the rear window shelf when it is desired to change the message transparency on a facet. This can be done conveniently by sliding the transparencies in and out of corner strips forming channels on the top and bottom of each facet.

The number of facets on the light box depends on the number of discrete messages one wishes to display and the size of the light box. Realistically, the facets can number two, three, four, six or eight. The cross-section of the light box then is a regular polygon with the appropriate number of facets forming its sides. For the sake of illustration only, the drawings in this application show a system with four facets so that the light box has a square cross-section.

The rotation mechanism can be actuated by mechanical, hydraulic, pneumatic, vacuum, electromechanical or electromagnetic means. Likewise, the indication or feedback mechanism can be mechanical, electrical or electronic in nature. The preferred system of this invention comprises actuation and indication of rotation by electric means. Since the required rotary motion is intermittent, brief, and need not be fast, such actuation can be performed by a direct-acting solenoid, stepper motor, electromagnet or a geared-down electric motor acting over short time periods.

The preferred embodiments of this invention comprise actuation of light box rotation by a solenoid-ratchet combination, and indication of facet orientation by a rotary switch co-axial with the ratchet mechanism. This configuration for the Third Brake Light and Illuminated Message Combination serves the stated objects of simplicity, high reliability, low manufacturing cost, ease of installation and straightforward operation.

BRIEF DESCRIPTION OF THE DRAWINGS

As stated in the Summary of the Invention above, the accompanying drawings show the example of a Third Brake Light Combination with four facets. A better understanding of the invention may be gained by reference to the following Detailed Description in conjunction with the drawings provided in which.

DETAILED DESCRIPTION OF THE PREFERRED EMBODIMENTS

Figure 1:
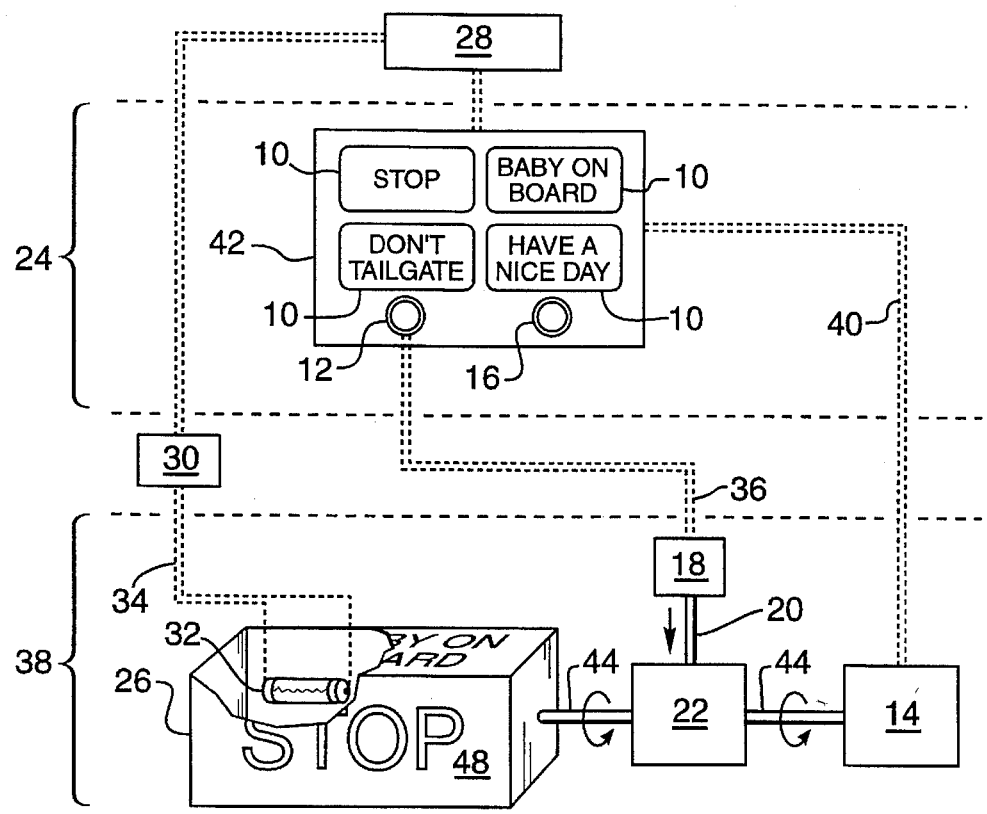
FIG.1 is a system diagram showing the electrical (dashed line) and mechanical (solid line) connections between the control unit on the dashboard and the light box on the rear window shelf for the Third Brake Light Combination actuation and indication functions.

Referring to FIG.1, a system diagram of the Third Brake Light and Illuminated Message Combination, vehicle battery 28, typically 12 volt, energizes the whole system. The battery 28 is connected through brake switch 30 to display lamps 32 inside light box 26 on rear window shelf 38. The displayed message STOP, shown as example, on light box 26 is illuminated only when the vehicle brakes are applied, closing brake switch 30 and lighting lamps 32.

Control unit 42 mounted on vehicle dashboard 24 enables the driver to rotate light box 26 so as to bring desired facet 48 into the display position facing the rear of the vehicle, and also indicates to the driver which facet is in the display position.

The driver pushes push switch 12 to rotate light box 26 one facet over per push until the desired facet is in the display position. Pushing switch 12 energizes solenoid 18 via control wires 36, resulting in linear motion of plunger 20 to rotate ratchet assembly 22 one step. This causes shaft 44, which rigidly connects ratchet assembly 22 and light box 26, to rotate the next facet 48 of light box 26 into position. Ratchet assembly 22 is so designed that rotation of one ratchet step equals rotation of light box 26 from one facet to the next.

Also rigidly connected to ratchet assembly 22 is rotary switch 14 which has as many positions as there are facets. When any given facet is in the display position, switch 14, via indicator wires 40, lights up the corresponding indicator light 10 in the dashmounted control unit 42. This tells the driver which facet is in the display position.

The driver has the option of darkening the panel of indicator lights 10 by use of selector switch 16, also mounted on control unit 42. Switch 16 is wired into indicator wires 40 and lamp control wires 34 in such a way that a brake application will light up the active indicator light 10 as long as brake switch 30 is closed, even when switch 16 has previously darkened the panel.

Figure 2:
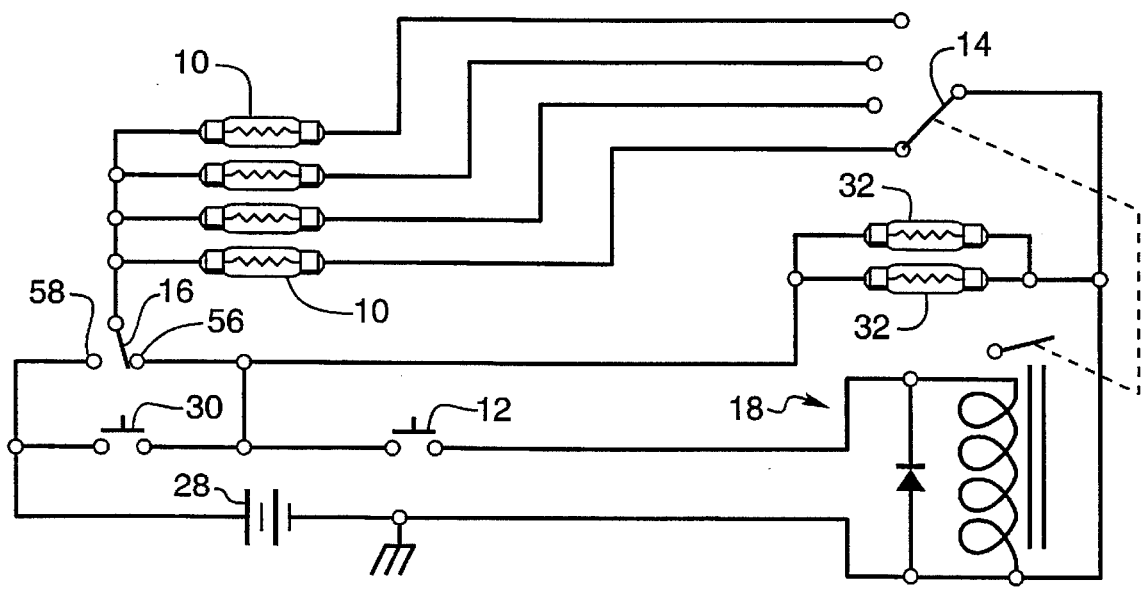
FIG.2 is a wiring diagram for the Third Brake Light Combination showing the energizing battery and all switches, lights and other electrical components.

Referring to FIG.2, the wiring diagram for the whole system, energized by battery 28, shows a four-position rotary switch 14 and four indicator lights 10 corresponding to four light box facets. Also, for the sake of example, two display lamps 32 for light box facet illumination are shown. Push switch 12 and brake switch 30 are on-off switches, but selector switch 16 is of the single-pole, single-throw type. When switch 16 closes contact 58, an indicator light 10 is permanently lit. When switch 16 closes contact 56, indicator lights 10 are dark, except when brake application closes switch 30 and lights up the active light 10. The mechanical action of solenoid 18 in moving rotary switch 14 is shown by dashed lines.

Figure 3:
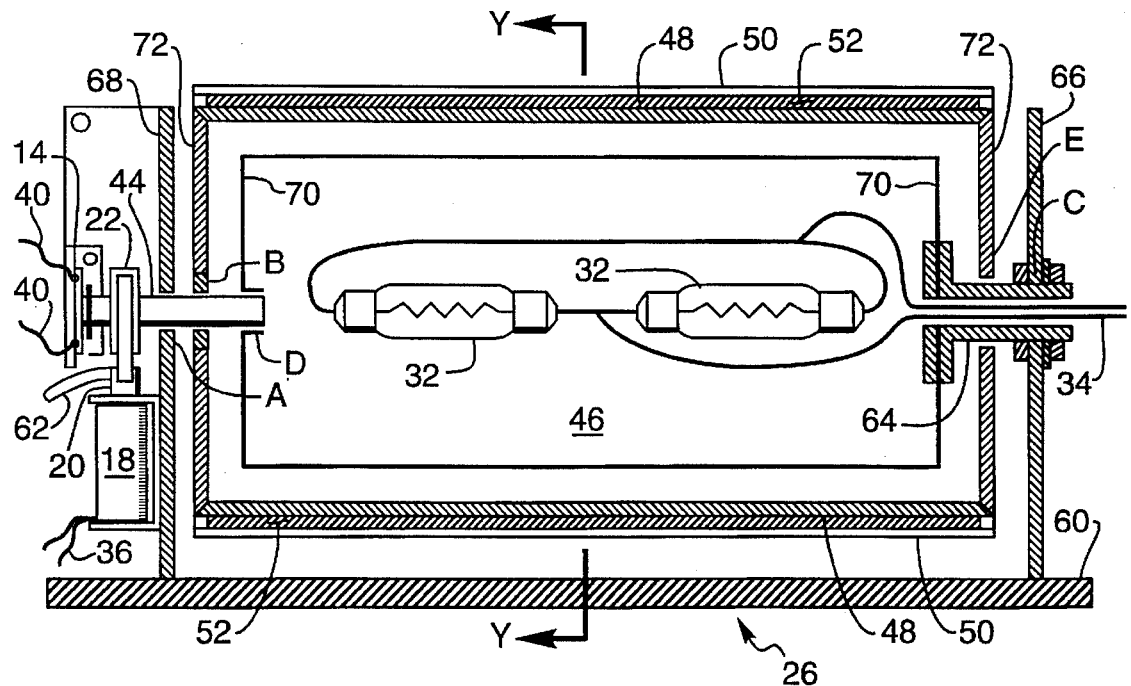
FIG.3 is a cutaway sectional elevation of the light box viewed in direction X—X in FIG.4.
Figure 4:
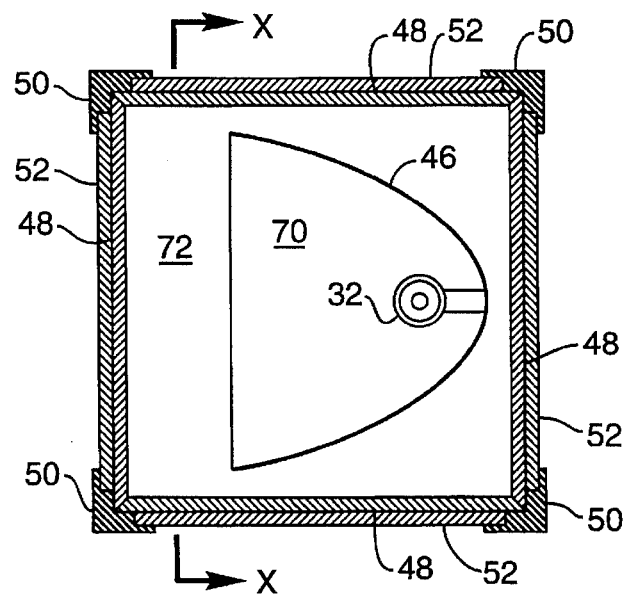
FIG.4 is a sectional end view of the light box viewed in direction Y—Y in FIG.3.

Referring to FIG.3 and FIG.4, the light box 26 is mounted on a base 60 consisting of a horizontal plate and two vertical plates 66 and 68 to which requisite bearings for box rotation are attached. Box 26 is made up of four facets 48 in the form of reddish translucent plastic plates joined to each other and to two endplates 72 to form a box. At the four edges where facets 48 join, channel-like corner strips 50 provide for longitudinal slots wherein may be slidably and replaceably inserted message-bearing transparent strips 52.

A cylindrical sleeve 64 rigidly attached to vertical plate 66 at point C forms one of the bearings for rotation of box 26 at point E, and also holds in place parabolic reflector 46 with two side walls 70. Two lamps 32 are attached to reflector 46 at the apex of its parabola to illuminate the translucent facet 48 with its message strip 52 in the display position for viewing from the rear of the vehicle in direction X-X in FIG.4o Side walls 70 on reflector 46 prevent light from lamps 32 from reaching any of the three other facets 48. The lamps 32 receive electrical power through lamp control wires 34 from battery 28.

The box end plate 72 remote from sleeve 64 has rigidly attached to it at point B a round shaft 44 carried in a bearing in vertical plate 68 at point A. Rotation of shaft 44 produces rotation of box 26, supported by bearings at points A and E. To keep reflector 46 stationary during rotation of box 26, shaft 44 terminates in a bearing integral with reflector 46 at point D.

Attached to vertical plate 68 is solenoid 18 powered by solenoid control wires 36, terminating in plunger 20 whose upward motion causes rotation of ratchet assembly 22. Since both ratchet assembly 22 and box 26 are rigidly attached to shaft 44, solenoid actuation produces rotation of box 26. Further, shaft 44 also carries rotary switch 14 which can contact any of four terminals on an insulated strip integral with plate 68. The signal from rotary switch 14 is transmitted through indicator wires 40 to dashboard control unit 42.

Figure 5:
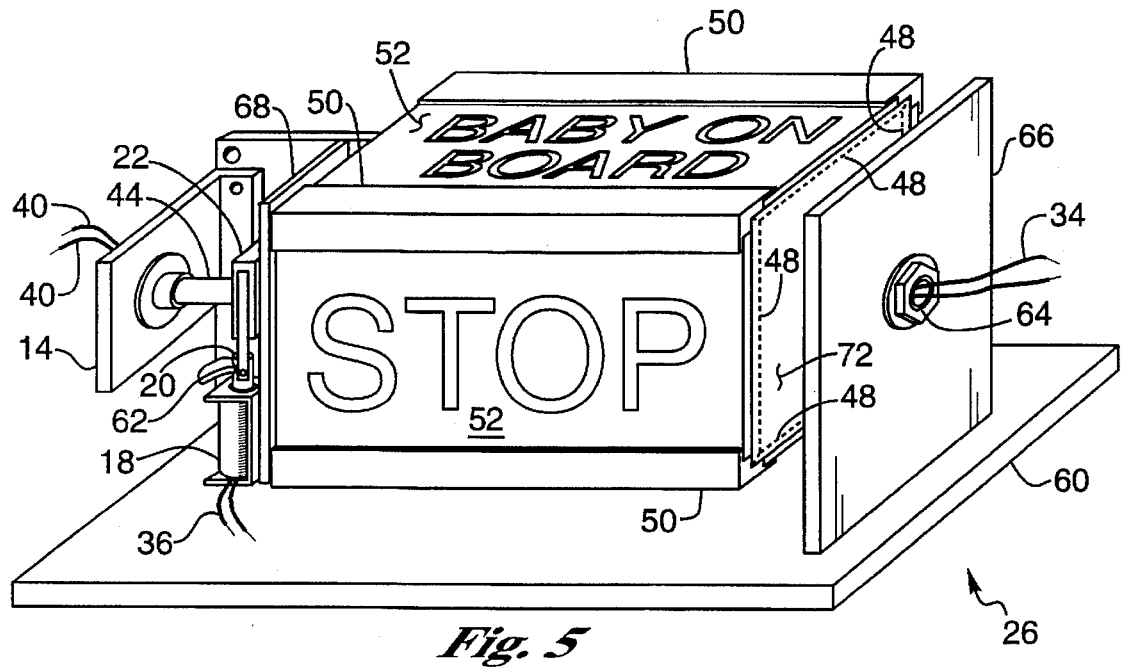
FIG.5 is a pictorial view of the light box on the rear window shelf as seen from rear of the vehicle.

Referring to FIG.5, the pictorial view of box 26 supported on base 60 shows the external appearance of the device on the rear window shelf with specific embodiments. All visible components are identified by the same numerals as in FIG.3 and FIG.4. One additional component shown on FIG.5 is the manual solenoid override 62 in the form of a lever for moving facets 48 into positions suitable for exchange of message strips 52 by sliding them in and out of corner strips 50.

Figure 6:
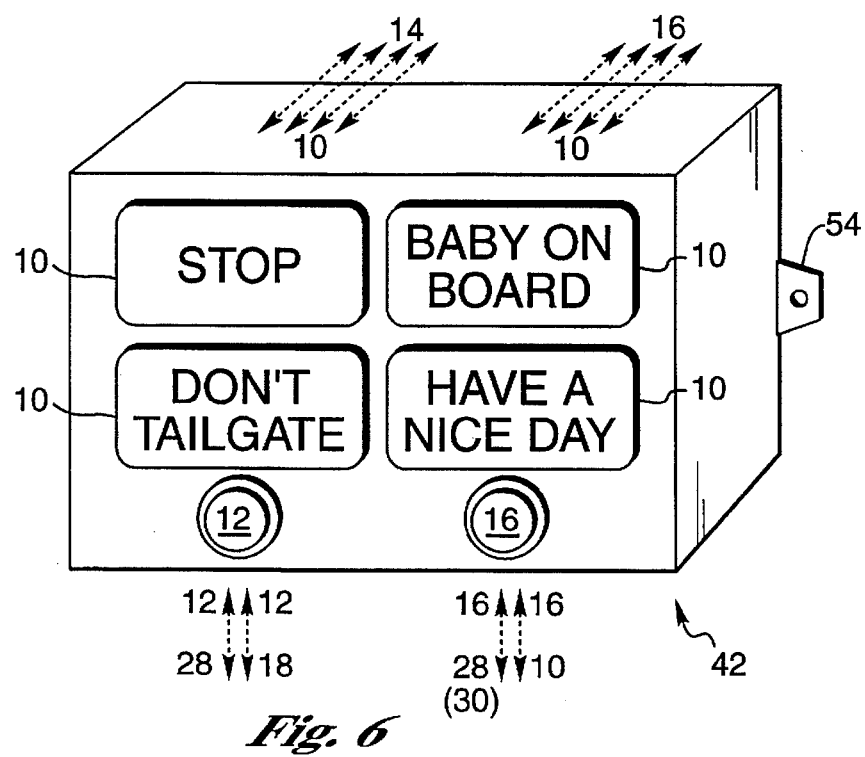
FIG.6 is a diagram of the control unit on the vehicle dashboard showing electrical (dashed line) connections to the remainder of the system.

Referring to FIG.6, a diagram of control unit 42 mounted to the dashboard by brackets 54, the various electrical connections are shown. Each indicator light 10 is connected to rotary switch 14 and selector switch 16. Push switch 12 is connected to solenoid 18 and battery 28. Selector switch 16 is connected to battery 28 and brake switch 30 as well as each indicator light 10. The exact electrical connections are shown in the wiring diagram of FIG.2.

The operation of the Third Brake Light and Illuminated Message Combination is illustrated by means of FIGS.1-6. First, the control unit 42 is attached to dashboard 24 using brackets 54 and wired up to battery 28 and the components associated with the light box 26 on rear window shelf 38. Then, using the solenoid manual override 62, suitable transparent message strips 52 are inserted into the corner strips 50 on all facets of light box 26.

The driver may now use selector switch 16 to illuminate or darken the indicator light 10 with its inserted replica of transparent message strip 52 corresponding to the active facet 48 on display as he or she wishes. In either case the facet 48 on display and the corresponding indicator light 10 will light up when the driver presses the brake pedal. At any time the driver may change the facet 48 and associated message 52 on display by pushing push switch 12 as many times as needed to rotate the light box 26 into the desired position.

Other realizations of the present invention are possible without departing from the spirit and scope of the invention as delineated in the appended claims.

I claim:

1. A third brake light and illuminated message combination for installation in a vehicle comprising:
   a. a closed hollow light box in the shape of a prismatoid rotatable about its longitudinal axis having on its lateral circumference a plurality of transparent facets;
   b. transparent strips carrying predetermined messages replaceably mounted one on each transparent facet;
   c. a lighting means located within the light box to illuminate only one of the message-bearing facets to be visible from outside the vehicle the lighting means comprises a plurality of lamps attached to a stationary reflector within the light box, said reflector directing illumination only toward the rear of the vehicle through a message-bearing translucent facet in the display position;
   d. a rotation means for rotating the light box, capable of placing a selected transparent message-bearing facet in proper display position for illumination by the lighting means the rotation means comprises an electromagnetic solenoid actuating a ratchet assembly which has a plurality of steps equal to the plurality of transparent facets, fastened to a shaft which rotates the light box about its longitudinal axis, said solenoid also comprising a manual override useful for rotating transparent facets when replacing transparent message strips;
   e. a remote control means for actuating the light box rotation means and for indicating which message-bearing transparent facet is in the display position; and
   f. a power means for energizing the rotation means and remote control means, and for energizing the lighting means, said lighting means being activated only when the vehicle brakes are applied.

2. The combination of claim 1 wherein the light box is rotatably mounted in a base placed on the rear window shelf of the vehicle with the facet display position facing the rear of the vehicle.

3. The combination of claim 2 wherein the light box has the cross-section of a regular polygon, each polygonal side of the light box being a transparent facet made of transparent red plastic plate.

4. The combination of claim 3 wherein the regular polygon has three sides.

5. The combination of claim 3 wherein the regular polygon has four sides.

6. The combination of claim 3 wherein the regular polygon has six sides.

7. The combination of claim 3 wherein the regular polygon has eight sides.

8. The combination of claim 1 wherein the remote control means comprises a control unit within reach and sight of the driver, said control unit incorporating a push switch for remote actuation of the solenoid, a plurality of indicator lights equal to the plurality of transparent facets with one of the indicator lights indicating which message-bearing transparent facet is in the display position, and a selector switch enabling the indicator lights to be darkened except when the vehicle brakes are applied.

9. The combination of claim 8 wherein the power means comprises the vehicle battery and suitable electrical circuitry to accomplish the rotation, indication and illumination functions.

* * * * *